United States Patent
Yamauchi et al.

(10) Patent No.: US 7,723,445 B2
(45) Date of Patent: May 25, 2010

(54) CURABLE RESIN COMPOSITION, MOLDED PRODUCT, AND PROCESS FOR PRODUCING THE SAME

(75) Inventors: Shintaro Yamauchi, Isesaki (JP); Kazuo Otani, Kumagaya (JP)

(73) Assignee: Showa Highpolymer Co., Ltd., Tokyo (JP)

( * ) Notice: Subject to any disclaimer, the term of this patent is extended or adjusted under 35 U.S.C. 154(b) by 540 days.

(21) Appl. No.: 11/659,117

(22) PCT Filed: Aug. 4, 2005

(86) PCT No.: PCT/JP2005/014339

§ 371 (c)(1),
(2), (4) Date: Feb. 1, 2007

(87) PCT Pub. No.: WO2006/013943

PCT Pub. Date: Feb. 9, 2006

(65) Prior Publication Data

US 2009/0008834 A1 Jan. 8, 2009

(30) Foreign Application Priority Data

Aug. 6, 2004 (JP) ............................. 2004-230502

(51) Int. Cl.
*B29C 35/02* (2006.01)
*B29C 35/08* (2006.01)
*B29C 39/02* (2006.01)
*C08L 63/10* (2006.01)

(52) U.S. Cl. .................. 525/531; 264/331.12; 264/496; 525/423; 525/502

(58) Field of Classification Search .................. 264/496
See application file for complete search history.

(56) References Cited

U.S. PATENT DOCUMENTS

| | | | |
|---|---|---|---|
| 3,418,118 A | | 12/1968 | Thommes et al. |
| 3,873,502 A | * | 3/1975 | Hickner et al. ............... 528/109 |
| 5,128,424 A | * | 7/1992 | McGinnis et al. ........... 525/481 |
| 5,245,770 A | | 9/1993 | Ko et al. |

FOREIGN PATENT DOCUMENTS

| | | | |
|---|---|---|---|
| EP | 0438123 A2 | | 7/1991 |
| JP | 45-37377 | | 11/1970 |
| JP | 56-76465 A | * | 6/1981 |
| JP | 3-111402 A | | 5/1991 |
| JP | 3-179003 A | | 8/1991 |
| JP | 4-146905 A | | 5/1992 |
| JP | 4-261405 A | | 9/1992 |
| JP | 4-261406 A | | 9/1992 |
| JP | 5-194619 A | | 8/1993 |
| JP | 6-88353 A | | 3/1994 |
| JP | 7-233242 A | * | 9/1995 |
| JP | 9-3158 A | * | 1/1997 |
| JP | 2001-131262 A | * | 5/2001 |
| JP | 2002-256041 A | | 9/2002 |
| JP | 2005-247879 A | | 9/2005 |

OTHER PUBLICATIONS

Yamaoka et al., "Surface", 27 (7), 548 (1989).
Sato et al., "A collection of Summary of No. 3 Polymeric Materials Forum" in IBP18 (1994).

* cited by examiner

*Primary Examiner*—Robert Sellers
(74) *Attorney, Agent, or Firm*—Sughrue Mion, PLLC

(57) ABSTRACT

By heating, allowing to stand at normal temperature, or irradiating in the presence of a photo-polymerization initiator, a curable resin composition which contains (A) a resin material having a radical polymerizable unsaturated group and an epoxy group, (C) a radical polymerization initiator, (D) an amine compound and/or a mercaptan compound containing one or more of active hydrogen in one molecule, and (E) a compound, which is an adduct in which the (D) amine compound and/or a mercaptan compound, is reacted with the radical polymerizable unsaturated group of the (A) resin material, thereby a cured product can be obtained.

9 Claims, No Drawings

CURABLE RESIN COMPOSITION, MOLDED PRODUCT, AND PROCESS FOR PRODUCING THE SAME

TECHNICAL FIELD

The present invention relates to a curable resin composition, molded product and a process for producing the same.

Priority is claimed on Japanese Patent Application No. 2004-230502, filed Aug. 6, 2004, the content of which is incorporated herein by reference.

BACKGROUND ART

Many of the molded products of which strength is required to be high, consist of fiber-reinforced plastics (FRP) in which a reinforcing fiber such as carbon fiber, aramid fiber and epoxy resin is combined.

As a forming process thereof, there are filament winding molding, drawing molding, transfer molding (RTM), autoclave molding using prepreg in which resin is impregnated into a reinforcing fiber beforehand, and a pressing molding.

Among them, RTM and a forming process similar to RTM is attracting attention because of excellent productivity thereof.

In accordance with RTM, textile-like continuous fiber is set in a mold at one time, and then a resin composition is poured into the mold to be cured, and hence the production efficiency is high. It should be noted that, as for RTM, it is necessary to decrease the viscosity of the resin composition to be poured, such that penetrating property of the resin into the reinforcing fiber increases. However, there is a problem in that epoxy resin is not suitable for RTM because it is difficult to decrease the viscosity of epoxy resin and it takes a long time for curing epoxy resin.

It is effective to heat the resin composition to be cured at a high temperature, in order to accelerate the curing of resin. However, when the molded product is large, it is likely to be difficult to heat for keeping it at a high temperature, and it has been difficult to mold it for a short time, because the temperature hardly increases in such a case. Moreover, when the molded product is large, it has been a large obstacle to install a heating apparatus, because a large-scale apparatus is required and costly.

On the other hand, an example using vinyl ester resin as a resin composition has been disclosed in Patent document 1 (one patent document reference). Since vinyl ester resin has a low viscosity, penetrating property thereof into reinforcing fiber is excellent and the chemical resistance of the resultant molded product will be high. In addition, it possible to cure vinyl ester resin at a lower temperature for a shorter time, compared to the case of using epoxy resin, because radical polymerization occurs using a peroxide catalyst therein. However, in general, when vinyl ester resin is used, the adherent property of the interface between the carbon fiber and the resin is inferior to the case of using epoxy resin, even if using carbon fiber which has been treated with a sizing agent for use in vinyl ester resin, and hence there is a problem in that the interlayer shearing strength deteriorates.

[Patent document 1]

Japanese Unexamined Patent Application, First Publication No. H06-088353

DISCLOSURE OF THE INVENTION

Therefore, it is an object of the present invention to provide a curable resin composition having both rapid curability and excellent adherence to reinforcing fibers, a molded product having an excellent adherence of an interface between reinforcing fiber and resin, and a process for producing the same A curable resin composition of the present invention includes (A) resin material having a radical polymerizable unsaturated group and an epoxy group, (C) radical polymerization initiator, (D) an amine compound and/or a mercaptan compound containing one or more of active hydrogen in one molecule, and (E) a compound which is an adduct in which the amine compound and/or a mercaptan compound is reacted with the radical polymerizable unsaturated group of the (A) resin material.

The curable resin composition preferably further contains (F) tertiary amine.

Here, (F) tertiary amine is preferably a tertiary amine which contains a radical polymerizable unsaturated group in a molecule.

The curable resin composition of the present invention preferably further contains (G) reinforcing fiber.

The (A) resin material having a radical polymerizable unsaturated group and epoxy group is preferably a resin obtained by vinyl ester group modified epoxy resin so that the equivalence ratio between the epoxy group and the radical polymerizable unsaturated group ranges from 0.95/0.05 to 0.05/0.95.

Or, the (A) resin material having a radical polymerizable unsaturated group and epoxy group is preferably a mixture of an epoxy resin and a radical polymerizable resin so that the equivalence ratio between the epoxy group and the radical polymerizable unsaturated group ranges from 0.95/0.05 to 0.05/0.95.

The (C) radical polymerization initiator is preferably a normal temperature radical polymerization initiator consisting of an organic peroxide and a cobalt salt.

Or, the (C) radical polymerization initiator is preferably an organic peroxide and/or a photo polymerization-initiator.

The molded product of the present invention is one derived from curing the curable resin composition of the present invention.

Moreover, the process for producing the molded product of the present invention includes mixing (A) resin material having a radical polymerizable unsaturated group and epoxy group with (D) an amine compound and/or a mercaptan compound containing one or more of active hydrogen in one molecule and allowing to stand or stirring for not less than 5 minutes, and adding (C) radical initiator to the resultant mixture to prepare a curable resin composition, and curing the resultant curable resin composition at a temperature ranging from 25 to 80° C.

Here, the curable resin composition may be poured into a mold in which (G) reinforcing fiber is placed and then the curable resin composition is cured at a temperature ranging from 25 to 80° C.

Moreover, the process for producing the molded product of the present invention includes mixing (A) resin material having a radical polymerizable unsaturated group and epoxy group with (D) an amine compound and/or a mercaptan compound containing one or more of active hydrogen in one molecule and allowing to stand or stirring for not less than 5 minutes, and adding (C) radical initiator which contains at least a photo polymerization-initiator to the resultant mixture to prepare a curable resin composition, and irradiating the resultant curable resin composition to react the radical polymerizable unsaturated group to obtain a partially cured product, and further curing the resultant partially cured product at a temperature ranging from 25 to 80° C.

Here, the curable resin composition may be poured into a mold in which (G) reinforcing fiber is placed and then irradiating the curable resin composition to react the radical polymerizable unsaturated group to obtain a partially cured product, taking out the partially cured product from the mold, and further curing the partially cured product at a temperature ranging from 25 to 80° C.

EFFECT OF THE INVENTION

The curable resin composition of the present invention has both rapid curability and excellent adhesive property to a reinforcing fiber.

Moreover, the molded product of the present invention excels in the adhesive property of the interface between a reinforcing fiber and the resin.

Moreover, in accordance with the process for producing the molded product of the present invention, such a molded product can be produced easily.

BEST MODE FOR CARRYING OUT THE INVENTION

(A) Resin Material

As the (A) resin material having a radical polymerizable unsaturated group and epoxy group (it may referred to as (A) resin material, below) having the epoxy basis, one which is obtained by blending an epoxy resin and a radical polymerizable resin, and a resin which contains an epoxy group and a radical polymerizable unsaturated group in a molecule are exemplary.

Among them, in view of the strength etc., the latter one, i.e. a resin which contains an epoxy group and a radical polymerizable unsaturated group in a molecule is preferable.

The equivalence ratio between epoxy groups and radical polymerizable groups (radical polymerizable unsaturated groups/epoxy groups) preferably ranges from 0.95/0.05 to 0.05/0.95, more preferably ranges from 0.2/0.8 to 0.8/0.2. If the equivalence of the radical polymerizable unsaturated group is less than 0.05, then the rapid curability, which is a characteristic of the radical polymerizable component, may not be sufficiently developed, whereas if the equivalence of radical polymerizable unsaturated group is over 0.95, then the adherent property of the interface between a reinforcing fiber and the resin, which is a characteristic of the epoxy component, may not be sufficiently developed.

As the (A) resin material having the equivalence ratio between the epoxy group and the radical polymerizable unsaturated group ranging from 0.95/0.05 to 0.05/0.95, a mixture of an epoxy resin and a radical polymerizable resin so that the equivalence ratio between the epoxy group and the radical polymerizable unsaturated group is within the range; and a resin obtained by vinyl ester group modified epoxy resin so that the equivalence ratio between the epoxy group and the radical polymerizable unsaturated group is with in the range are exemplary. Among them, the latter resin is preferable, in view of physical properties thereof. Specifically, those having a (meth)acryl group and an epoxy group, which are obtained by performing an addition reaction of unsaturated monobasic acid with epoxy groups of the epoxy resin through a generally known method to convert into (meth)acryloyl, which is a polymerizable resin having a function of radical polymerization and epoxy curing.

As the epoxy resin, those which are produced by a well-known method can be used, in particular, a heat-curable epoxy resin having at least two epoxy groups in one molecule is preferable. As such an epoxy resin, for example, a bisphenol type epoxy resin of an ether type, a novolac type epoxy resin, a polyphenol type epoxy resin, an aliphatic type epoxy resin, an ester type aromatic epoxy resin, a cyclic aliphatic epoxy resin, ether and ester type epoxy resin, a glycidyl amine type epoxy group, their halides, those of which the molecular chain is extended with phenols or dibasic acids etc., are exemplary. Epoxy resin may be used alone, or in combination of two or more thereof.

As the radical polymerizable resin for use in the case of blending the radical polymerizable resin into the epoxy resin, a well-known resin, such as a vinyl ester resin, an unsaturated polyester resin, urethane(meth)acrylate resin, polyester (meth)acrylate resin, an acrylic resin, etc., are exemplary. The radical polymerizable resin to be used for blending may be used alone, or in combination of two or more thereof.

(B) Diluent

In the present invention, (B) a diluent, namely a diluent having a radical polymerizable unsaturated group and/or a diluent having an epoxy group may be used to adjust the viscosity of the curable resin composition.

As the diluent having a radical polymerizable unsaturated group, those which are used for vinyl ester resin are exemplary. Specifically, styrene monomer, and a radical polymerizable unsaturated monomer which contains a (meta)acrylic group are exemplary. As a radical polymerizable unsaturated monomer other than styrene monomer, styrene type monomers such as α-, o-, m-, and p-alkyl, nitro, cyano, amide, and ester derivative of styrene, chlorostyrene, vinyl toluene, divinyl benzene, etc.; dienes such as butadiene, 2,3-dimethyl butadiene, isoprene, chloroprene, etc.; (meth)acrylates, such as ethyl(meth)acrylate, n-propyl(meth)acrylate, i-popyl (meth)acrylate, n-butyl(meth)acrylate, sec-butyl(meth)acrylate, tert-butyl(meth)acrylate, pentyl(meth)acrylate, neopentyl(meth)acrylate, isoamyl(meth)acrylate, hexyl(meth) acrylate, ethyl hexyl(meth)acrylate, lauryl(meth)acrylate, dodecyl(meth)acrylate, cyclopentyl(meth)acrylate, cyclohexyl(meth)acrylate, 2-methyl hexyl(meth)acrylate, dicyclohexyl(meth)acrylate, dicyclopentenyloxyethyl(meth)acrylate, isophoronyl(meth)acrylate, adamantyl(meth)acrylate, aryl(meth)acrylate, propargyl(meth)acrylate, phenyl(meth) acrylate, naphthyl(meth)acrylate, anthracenyl(meth)acrylate, anthraniloyl(meth)acrylate, piperonyl(meth)acrylate, salicylic(meth)acrylate, furyl(meth)acrylate, furfuryl(meth) acrylate, tetrahydro furfuryl(meth)acrylate, pyranyl(meth) acrylate, benzyl(meth)acrylate, phenethyl(meth)acrylate, cresyl(meth)acrylate, 1,1,1-trifluoroethyl(meth)acrylate, perfluoro(meth)acrylate, perfluoro-n-propyl(meth)acrylate, perfluoro-i-propyl(meth)acrylate, triphenyl methyl(meth) acrylate, 3-(N,N-dimethylamino)propyl(meth)acrylate, 2-hydroxyethyl(meth)acrylate, etc.; (meth)acrylic amides, such as (meth)acrylic amide, (meth)acrylic N,N-dimethyl amide, (meth)acrylic N,N-diethyl amide, (meth)acrylic N,N-dipropyl amide, (meth)acrylic N,N-di-i-propyl amide, (meth) acrylic anthracenyl amide, etc.; vinyl compounds such as (meth)acrylic anilide, (meth) acrylonitrile, acrolein, vinyl chloride, vinylidene chloride, vinyl fluoride, vinylidene fluoride, N-vinyl pyrolidone, vinyl pyridine, vinyl acetate, etc.; unsaturated dicarboxylic diesters such as diethyl citraconate, diethyl maleate, diethyl fumarate, diethyl itaconate, etc.; monomaleimide compounds such as N-phenyl maleimide, N-cyclohexylmaleimide, N-lauryl maleimide, N-(4-hydroxyphenyl)maleimide, etc.; N-(meth)acrylonitrile phtalimide are exemplary.

The diluent having an epoxy group may be a compound which has a glycidyl type epoxy group or an alicyclic epoxy group in a molecule, and a well-known one can be used.

As the glycidyl type one, a well-known monofunctional epoxy diluent such as aryl glycidyl ether, phenyl glycidyl ether, butyl glycidyl ether, 2-ethyl hexyl glycidyl ether, etc.; and polyfunctional epoxy diluent such as neopentyl diglycidyl ether, 1,6-hexanediol diglycidyl ether, ethylene glycol diglycidyl ether, polyethylene glycol diglycidyl ether, propylene glycol diglycidyl ether, polypropylene glycol diglycidyl ether, resorcin diglycidyl ether, trimethylol propane triglycidyl ether, etc. are exemplary.

As the compound having an alicyclic epoxy group, 3,4-epoxy cyclohexenyl methyl-3'4'-epoxy cyclohexene carboxylate, ε-caprolactone modified 3,4-epoxy cyclohexyl-3'4'-epoxy cyclohexane carboxylate, vinyl cyclohexene monoxide-1,2-epoxy-4-vinyl cyclohexane, 1,2:8,9 diepoxy limonene, 3,4-epoxy cyclohexyl methyl methacrylate, etc. are exemplary.

These compounds may be used alone or in combination of two or more thereof. As a commercially available product of the alicyclic epoxy compound, for example, CEROXIDE 2021, 2081, 2000 and 3000, and CYCLOMER M100 etc., produced by DAICEL CHEMICAL INDUSTRIAL Co., Ltd. are exemplary.

Moreover, in the case of using cation polymerization, vinyl ether compounds such as tetraethyleneglycol divinyl ether etc. can be also used.

The diluent having a radical polymerizable unsaturated group is radical polymerized with a radical polymerizable unsaturated group in the (A) resin material to be cured, whereas the diluent having an epoxy group reacts with an epoxy group in the (A) resin material and an epoxy curing agent to be cured.

Each of the diluent having a radical polymerizable unsaturated group and the diluent having an epoxy group may be used alone or mixed with each other at an arbitrary ratio.

The compounding amount of the diluent having a radical polymerizable unsaturated group and/or the diluent having an epoxy group ranges from 0 to 200 mass parts, preferably from 0 to 150 mass parts in terms of the total of the diluent to 100 mass parts of the (A) resin material.

If the total amount of the diluent to be used is more than 200 mass parts, then the curing shrinking percentage will increase, and it may not develop strength sufficiently. Here, the amount of the (A) resin material is the sum of the amount of the (A) resin material which is reacted with the (D) amine compound and/or mercaptan compound mentioned later, and the amount of the (A) resin material which is not reacted.

(C) Radical Polymerization Initiator

As the (C) radical polymerization initiator, a thermal polymerization initiator which is represented by an organic peroxide or an azo compound, and a photo polymerization initiator are exemplary.

As the thermal polymerization initiator, well-known organic peroxides and azo compounds, which are classified into ketone peroxide, peroxy ketal, hydroperoxide, diaryl peroxide, diacyl peroxide, peroxy ether, and peroxydicarbonate are exemplary. Specifically, benzoyl peroxide, dicumyl peroxide, diisopropyl peroxide, di-t-butyl peroxide, t-butyl peroxide benzoate, 1,1-bis(t-butyl peroxy)-3,3,5-trimethyl cyclohexane, 2,5-dimethyl-2,5-bis(t-butylperoxy)hexine-3, 3-isopropyl hydroperoxide, t-butyl hydroperoxide, dicumyl peroxide, dicumyl hydroperoxide, acetyl peroxide, bis(4-t-butylcyclohexyl)peroxydicarbonate, diisopropylperoxydicarbonate, isobutyl peroxide, 3,3,5-trimethyl hexanoyl peroxide, lauryl peroxide, azobisisobutylonitrile, azobiscarbon amide etc. are exemplary.

Moreover, a normal temperature radical polymerization initiator may be used in order to accelerate the curing. As the normal temperature radical polymerization initiator, a combination of a well-known ketone peroxide and a reducing agent, a combination of a hydroperoxide and a reducing agent, and a combination of a diacyl peroxide and a reducing agent are exemplary. Specifically, as the reducing agent, cobalt salts such as cobalt naphthenate, cobalt octinate, etc.; vanadium compounds such as vanadium pentaoxide etc.; amines such as dimethyl aniline etc. are exemplary.

Among them, a combination of organic peroxides such as peroxy ester and a cobalt salt is particularly effective, in view of the pot life etc.

When photo-curing is performed, a photoinitiator is used. As the photo polymerization-initiator, those which have photosensitivity in the area of ultraviolet rays or a near-infrared light can be used.

As the ultraviolet rays polymerization initiator, well-known ones which are represented by acetophenone type, benzyl ketal type, and (bis) acyl phosphine oxide type can be used. Among them, ultraviolet rays polymerization initiators having comparatively long wavelength, in particular those having sensitivity in the wavelength area of not less than 300 nm such as (bis) acyl phosphine oxide type are preferable, in order to increase the optical transparency.

As a visible photo polymerization initiator having photosensitivity in a visible light area, for example, in addition to single visible photo polymerization initiators, such as camphor quinine, benzyl trimethyl benzoyl diphenyl phosphine oxide, methylthio xanthone, dicyclopentadienyl titanium-di (pentafluorophenyl), which have been disclosed in "Surface" 27 (7), 548 (1989), written by Yamaoka et al.; "A collection of summary of No. 3 polymeric materials forum" in IBP18 (1994), written by Sato et al., a well-known composite initiator system, such as a hexa aryl bisimidazole/radical generator, which has been disclosed in Japanese Examined Patent Application second publication No. Sho.45-37377, such as an organic peroxide/pigment, a diphenyl iodonium salt/pigment, an imidazole/keto-compound, hexa aryl biimidazole compound/hydrogen donor compound, mercaptbenzothiazole/thiopyrylium salt, a metal arene/cyanine pigment, etc. are exemplary.

Moreover, acyl phosphine oxide compounds are effective as the initiator having photosensitivity over ultraviolet rays and a visible light domain. Specifically, bis(2,6-dichloro benzoyl)-phenyl phosphine oxide, bis(2,6-dichloro benzoyl)-2,5 dimethyl phenyl phosphine oxide, bis(2,6-dichloro benzoyl)-4-ethoxy phenyl phosphine oxide, bis(2,6-dichloro benzoyl)-4-biphenylyl phosphine oxide, bis(2,6-dichloro benzoyl)-4-propyl phenyl phosphine oxide, bis(2,6-dichloro benzoyl)-2-naphthyl phosphine oxide, bis(2,6-dichloro benzoyl)-1-naphthyl phosphine oxide, bis(2,6-dichloro benzoyl)-4-chloro phenyl phosphine oxide, bis(2,6-dichloro benzoyl)-2,2 dimethoxy phenyl phosphine oxide, bis(2,6-dichloro benzoyl)-dodecyl phosphine oxide, bis(2,6-dichloro benzoyl)-4-octyl phenyl phosphine oxide, bis(2,4,6-trimethyl benzoyl)-2,5-dimethyl phenyl phosphine oxide, bis(2,6-dichloro-3,4,5-trimethoxy benzoyl)-2,5-dimethyl phenyl phosphine oxide, bis(2,6-dichloro-3,4,5-trimethoxy benzoyl)-4-ethoxy phenyl phosphine oxide, bis(2-methyl-1-naphthoyl)-phenyl phosphine oxide, bis(2-methyl-1-naphthoyl)-4-biphenylyl phosphine oxide, bis(2-methyl-1-naphthoyl)-4-ethoxy biphenyl phosphine oxide, bis(2- methyl-1-naphthoyl)-2-naphthyl phosphine oxide, bis(2-methyl-1-naphthoyl)-4-propyl phenyl phosphine oxide, bis(2-methyl-1-naphthoyl)-2,5-dimethyl phenyl phosphine oxide, bis(2-methyl-1-naphthoyl)-4-methoxyphenyl phosphine oxide, bis(2,6-dimethoxy benzoyl)-2,4,4-trimethyl pentyl phosphine oxide, 2,4,6-trimethyl benzoyl-diphenyl phosphine oxide, 2,6-diphenyl benzoyl-diphenyl phosphine oxide, 2,6-dimethoxy benzoyl-diphenyl phosphine oxide, 2,3,5,6-tetra methyl benzoyl-diphenyl phosphine oxide, 2,6-dichloro benzoyl-diphenyl phosphine oxide, 2,3,6-trimethyl benzoyl-diphenyl phosphine oxide, 2-phenyl-6-methyl benzoyl diphenyl phosphine oxide, 2,6-dibromo benzoyl diphenyl phosphine oxide, 2,8-dimethyl naphthalene-1-carbonyl-diphenyl phosphine oxide, 1,3-dimethoxy naphthalene-2-carbonyl-diphenyl phosphine oxide, 2,4,6-trimethyl benzoyl phenyl phosphinic methyl ester, 2,6-dimethyl benzoyl-phenyl phosphinic methyl ester, 2,6-dichloro benzoyl phenyl phosphinic methyl ester, etc. are exemplary.

Specifically, for example, IRUGACURE-1700 (brand name, which is produced by Chiba specialty chemical Co., Ltd.) in which 2-hydroxy-2-methyl-1-phenyl propane-1-on (Dacrocur 1173, brand name, which is produced by Chiba specialty chemical Co., Ltd.) and bis(2,6-dimethoxy benzoyl)-2,4,4-trimethyl pentyl phosphine oxide (product, which is produced by Chiba specialty chemical Co., Ltd.) are mixed at a rate of 75%:25%; IRUGACURE-1800 (brand name, which is produced by Chiba specialty chemical Co., Ltd.) in which 1-hydroxy-cyclohexyl-phenyl-ketone (IRUGACURE-184, brand name, which is produced by Chiba specialty chemical Co., Ltd.) and bis(2,6-dimethoxy benzoyl)-2,4,4-trimethyl pentyl phosphine oxide (product, which is produced by Chiba specialty chemical Co., Ltd.) are mixed at a rate of 75%:25%; IRUGACURE-1850 (brand name, which is produced by Chiba specialty chemical Co., Ltd.) in which the same components are mixed at a rate of 50%:50%; bis(2,4,6-trimethyl benzoyl)-phenyl phosphine oxide (IRUGACURE-819, brand name, which is produced by Chiba specialty chemical Co., Ltd.); 2,4,6-trimethyl benzoyl-diphenyl phosphine oxide (Lucirin TPO, brand name, which is produced by BASF Co., Ltd.), and Darocur-4265 (brand name, which is produced by Chiba specialty chemical Co., Ltd.) in which 2-hydroxy-2-methyl-1-phenyl propane-1-on (Dacrocur 1173, brand name, which is produced by Chiba specialty chemical Co., Ltd.) and 2,4,6-trimethyl benzoyl-diphenyl phosphine oxide (Lucirin TPO, brand name, which is produced by BASF Co., Ltd.) are mixed at a rate of 50%:50% are exemplary.

Any visible light photoinitiator having photosensitivity within the wavelength ranging from 380 nm to 780 nm can be used, and they may be used in combination.

Moreover, as the photo polymerization-initiator which has sensitivity in the visible light domain of not less than 500 nm or near infrared radiation domain, a photopolymerization initiator in which a cation dye represented by the following general formula (1) is combined with an organic boron type compound represented by the following general formula (2) is preferable.

[Chemical formula 1]

$$D^+ \cdot A^- \qquad (1)$$

(in formula (1), $D^+$ is a dyestuff cation which has sensitivity in a visible light domain of near infrared irradiation domain in the type of methine, polymethine, cyanine, xanthene, oxazine, thiazine, aryl methane and pyrylium, and, $A^-$ represents various anions)

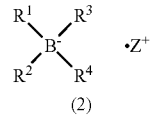

[Chemical formula 2]

(in formula (2), $Z^+$ represents an arbitrary cation, and each of $R^1$, $R^2$, $R^3$ and $R^4$ represents an alkyl group, an aryl group, an acyl group, aralkyl group, an alkenyl group, an alkynyl group, a silyl group, a heterocycle group, a halogen atom, a substituted alkyl group, a substituted aryl group, a substituted acyl group, a substituted aralkyl group, a substituted alkenyl group, a substituted alkynyl group, a substituted silyl group or a substituted heterocycle group, independently.)

Examples of combinations of the above cation dye and an organic boron type compound have been disclosed in detail in Japanese Unexamined Patent Application, First Publication Nos. H03-111402, H03-179003, H04-146905, H04-261405, H04-261406, and H05-194619. In the cation dyes, cyanine type cation dye, styryl type cation dye and triaryl methane type cation dye are preferably used. Cyanine type, and styryl type cation dyes easily donate and receive electrons with an organic boron type compound and hence they are preferable, in view of ease in initiating reaction.

The composition ratio between the organic boron type compound and the near infrared irradiation or visible light absorptive cation dye (organic boron type compound/cation dye) ranges from 1/5 to 1/0.05, preferably from 1/1 to 1/0.1 in terms of mass ratio. From the viewpoint of achromatizing reaction of a pigment and radical generating efficiency, it is preferable to use the organic boron type compound in an amount larger than that of the cation dye.

The compounding amount of the (C) radical polymerization initiator preferably ranges from 0.01 to 15 parts by mass, and more preferably ranges from 0.05 to 10 parts by mass to 100 parts by mass of the (A) resin material. If the compounding amount of the (C) radical polymerization initiator is less than 0.01 parts by mass, then polymerization is likely to be insufficient, whereas if the compounding amount of the (C) radical polymerization initiator is more than 15 parts by mass, then strength of the resultant cured product will be insufficient. Here, the amount of the (A) resin material is the total of the amount of the (A) resin material which is reacted with the (D) amine compound and/or mercaptan compound mentioned later, and the amount of the (A) resin material which is left non-reacted.

Moreover, each of the thermal polymerization initiator, and the photo polymerization-initiator may be used alone, or as a mixture in which each of which is mixed at an arbitrary percentage.

(D) Amine Compound and/or Mercaptan Compound

As an amine compound having one or more of active hydrogen in one molecule, well-known ones, such as aliphatic amines such as diethylene triamine, triethylene tetra amine, tetraethylene pentamine, hexamethylene diamine, trimethyl hexamethylene diamine, dipropylene diamine, diethylamino propyl amine, polyoxyethylene diamine, polioxy propylene diamine, etc.; alicyclic amines such as menthenediamine, isophorone diamine, bis(4-amino-3-methyl cyclohexyl) methane, bisamino methyl norbornane, 1,2-cyclohexane diamine, 1,3-cyclohexane diamine, bis(4-amino-3-methyl cyclo hexyl) methane, bis(amino methyl)

cyclohexane, 3,9-bis(3-amino propyl)-2,4,8,10-tetraspiro[5,5]undecane, etc.; aliphatic and aromatic amines such as m-xylylene diamine, tetrachloro-p-xylylene diamine, etc.; polyamides obtainable from polycarboxylic acids and an aliphatic or alicyclic amine, are exemplary.

It should be noted that the amine compound having one or more of active hydrogen in one molecule is not limited to these. These amine compounds may be used in combination of two or more thereof.

As the mercaptan compound, well-known ones can be used. A compound having two or more mercapto groups in one molecule is effective. EPOMATE QX10, EPOMATE QX20, EPOMATE QX11, EPICURE QX40, CAPCURE 3-800, and CAPCURE WR-6 (products which are produced by Japan epoxy resin Co., Ltd.) are exemplary. Moreover, those having mercaptan chemical equivalent (g/eq) of not less than 100 are practically preferable.

(E) Compound Obtained by Addition Reaction of the (D) Amine Compound and/or Mercaptan Compound to the Radical Polymerizable Unsaturated Group of the (A) Resin Material A part of the (D) amine compound and/or mercaptan compound having one or more of active hydrogen in one molecule (it may be referred to as merely a (D) amine compound/mercaptan compound, below) is additionally reacted with the radical polymerizable unsaturated group of the (A) resin material (and a diluent having radical polymerizable unsaturated group) beforehand, and is used as the (E) component. By additionally reacting a part of the (D) amine compound and/or mercaptan compound with the radical polymerizable unsaturated group, secondary or tertiary amine and/or an adduct of mercaptan will be generated in the resin framework, thereby accelerating the curing reaction of epoxy groups finally.

As the method for additionally reacting a part of the (D) amine compound and/or mercaptan compound to the radical polymerizable unsaturated group, a method which comprises mixing the (A) resin material (and a diluent having a radical polymerizable unsaturated group) with the (D) amine compound and/or mercaptan compound beforehand, and then allowing it to stand or stirring it at normal temperature or under heating for not less than 5 minutes, thereby performing an additional reaction of the part is exemplary. It should be noted that although there is a method which includes mixing all of the components (A) to (D) so as to perform an additional reaction of a part of the (D) amine compound and/or mercaptan compound to the radical polymerizable unsaturated group, if the (C) radical polymerization initiator exists in the case of proceeding an additional reaction under heating, then curing of the curable resin composition will proceed simultaneously, and hence the method which comprises mixing the (A) resin material (and a diluent having radical polymerizable unsaturated group) with the (D) amine compound and/or mercaptan compound beforehand is preferable.

The compounding amount of the (D) amine compound and/or mercaptan compound is preferably the sum total of the amount which corresponds to one which is necessary for performing an addition reaction of 1 to 30 mol % of all of the radical polymerizable unsaturated groups contained in the curable resin composition, and the amount which corresponds to the equivalent number of epoxy groups contained in the curable resin composition for curing the epoxy groups.

In the present invention, a (F) tertiary amine can be added in order to accelerate the final curing reaction of epoxy groups. As the (F) tertiary amine, well-known ones can be used, for example, benzyl dimethylamine, 2,4,6-tris(dimethylamino methyl) phenol, triethylamine, N,N'-dimethyl piperidine, 1,4-diazabicyclo(2,2,2) octane, etc. are exemplary.

Moreover, among the tertiary amine, a tertiary amine having a radical polymerizable unsaturated group in a molecule is particularly preferable, because this is incorporated into the polymer chain to prevent bleeding. As the tertiary amine having a radical polymerizable unsaturated group in a molecule, dialkylaminoalkyl(meth) acrylates, N-dialkyl amino alkyl group-containing unsaturated amides, and a tertiary amino group-containing vinyl aromatic compound are preferable, and various ones as follows are exemplary.

As dialkylaminoalkyl(meth)acrylates, dimethylamino methyl(meth)acrylate, diethylamino methyl(meth)acrylate, dimethylamino ethyl(meth)acrylate, diethylaminoethyl (meth)acrylate, 2-dimethyl amino ethyl(meth)acrylate, 2-diethylaminoethyl(meth)acrylate, 2-(di-n-propylamino) ethyl (meth)acrylate, 2-dimethyl amino propyl(meth)acrylate, 2-diethylamino propyl(meth)acrylate, 2-(di-n-propylamino) propyl(meth)acrylate, 3-dimethylamino propyl(meth)acrylate, 3-diethylamino propyl(meth)acrylate, 3-(di-n-propylamino) propyl(meth)acrylate, etc. are exemplary.

As the N-dialkyl amino alkyl group-containing unsaturated amides, (b) N-dimethyl amino methyl(meth) acryl amide, N-diethyl amino methyl(meth) acryl amide, N-(2-dimethyl amino ethyl)(meth)acryl amide, N-(2-diethyl amino ethyl)(meth) acryl amide, N-(2-dimethyl amino propyl) (meth)acryl amide, N-(2-diethyl amino propyl) (meth) acryl amide, N-(3-dimethyl amino propyl) (meth) acryl amide, N-(3-dimethyl amino propyl)(meth)acryl amide, etc. are exemplary.

As the tertiary amino group-containing vinyl aromatic compounds, N,N-dimethyl-p-amino styrene, N,N-diethyl-p-amino styrene, dimethyl (p-vinyl benzyl) amine, diethyl (p-vinyl benzyl) amine, dimethyl (p-vinyl phenethyl) amine, diethyl (p-vinyl phenethyl) amine, dimethyl (p-vinyl benzyl oxy methyl) amine, dimethyl[2-(p-vinyl benzyl oxy) ethyl] amine, diethyl (p-vinyl benzyl oxy methyl) amine, diethyl[2-(p-vinyl benzyl oxy) ethyl]amine, dimethyl (p-vinyl phenethyl oxy methyl) amine, dimethyl[2-(p-vinyl phenethyl oxy) ethyl]amine, diethyl (p-vinyl phenethyl oxy methyl) amine, diethyl[2-(p-vinylphenethyl oxy) ethyl]amine, 2-vinyl pyridine, 3-vinyl pyridine, 4-vinyl pyridine, etc. are exemplary.

The (F) tertiary amine may be used alone, and two or more thereof may be used in combination. The compounding amount of the (F) tertiary amine ranges from 0.1 to 30 parts by mass to 100 parts by mass of the total of the components of (A) to (E). If the content of the (F) tertiary amine is less than 0.1 parts by mass, then there is a danger that an effect of promoting curing may not develop, whereas if the content of the (F) tertiary amine is more than 30 parts by mass, then it might invite a deterioration in physical properties.

(G) Reinforcing Fiber

As the (G) reinforcing fiber in the present invention, organic and/or inorganic fibers can be used, for example, well-known ones such as a glass fiber, a carbon fiber, an alumina fiber, an aramid fiber, a polyethyleneterephthalate fiber, a vinylon fiber, etc. are exemplary. The shape is chopped strand mat, roving cross, roving mat, etc. The compounding amount of the (G) reinforcing fiber preferably ranges from 5 to 70 mass % in the curable resin composition (in 100 mass %).

Molded Product

The molded product of the present invention is obtained by curing the curable resin composition of the present invention. The curing of the curable resin composition of the present invention is performed under heating and/or a normal temperature. Moreover, those in which a photopolymerization initiator has been added may be irradiated at first to react the radical polymerizable unsaturated groups, and successively be cured under heating and/or a normal temperature.

The production of the molded product can be performed, for example, as follows.

At first, the (A) resin material, the (B) diluent, and the (D) amine compound and/or mercaptan compound are mixed and are allowed to stand or stirred for not less than 5 minutes to cause an addition reaction of the (D) amine compound and/or mercaptan compound to the radical polymerizable unsaturated group of the (A) resin material (and the diluent having a radical polymerizable unsaturated group).

Into the resultant mixture, the (C) radical polymerization initiator, the (D) amine compound and/or mercaptan compound for curing epoxy groups, if necessary, and the (F) tertiary amine are added to prepare a curable resin composition, and the curable resin composition is poured into a mold. Subsequently, the curable resin composition is cured at a temperature ranging from 25 to 80° C. in the mold to obtain a molded product.

Moreover, in the case of compounding a photopolymerization initiator into the curable resin composition, a molded product will be produced as follows:

At first, the (A) resin material, the (B) diluent, and the (D) amine compound and/or mercaptan compound are mixed and are allowed to stand or stirred for not less than 5 minutes to cause an addition reaction of the (D) amine compound and/or mercaptan compound to the radical polymerizable unsaturated group of the (A) resin material (and the diluent having a radical polymerizable unsaturated group).

Into the resultant mixture, the (C) radical polymerization initiator which contains at least a photopolymerization initiator, the (D) amine compound and/or mercaptan compound for curing epoxy groups, if necessary, and the (F) tertiary amine are added to prepare a curable resin composition, and the curable resin composition is poured into a mold (for example, an optically transparent mold of which the upper portion is made of a film). Subsequently, the curable resin composition is irradiated with light to react the radical polymerizable unsaturated groups to obtain a partially cured product, and the resultant cured product is taken out from the mold, and then the cured product is further cured at a temperature ranging from 25 to 80° C. to obtain a molded product.

Moreover, a molded product which contains the (G) reinforcing fiber will be produced, for example, as follows:

At first, the (A) resin material, the (B) diluent, and the (D) amine compound and/or mercaptan compound are mixed and are allowed to stand or stirred for not less than 5 minutes to cause an addition reaction of the (D) amine compound and/or mercaptan compound to the radical polymerizable unsaturated group of the (A) resin material (and the diluent having a radical polymerizable unsaturated group).

Into the resultant mixture, the (C) radical polymerization initiator, the (D) amine compound and/or mercaptan compound for curing epoxy groups, if necessary, and the (F) tertiary amine are added to prepare a curable resin composition, and the curable resin composition is poured into a mold in which the (G) reinforcing fibers are placed. Subsequently, the curable resin composition is cured at a temperature ranging from 25 to 80° C. to obtain a molded product.

Moreover, in the case of compounding a photopolymerization initiator into the curable resin composition, a molded product which contains the (G) reinforcing fiber will be produced as follows:

At first, the (A) resin material, the (B) diluent, and the (D) amine compound and/or mercaptan compound are mixed and are allowed to stand or stirred for not less than 5 minutes to cause an addition reaction of the (D) amine compound and/or mercaptan compound to the radical polymerizable unsaturated group of the (A) resin material (and the diluent having a radical polymerizable unsaturated group).

Into the resultant mixture, the (C) radical polymerization initiator which contains at least a photopolymerization initiator, the (D) amine compound and/or mercaptan compound for curing epoxy groups, if necessary, and the (F) tertiary amine are added to prepare a curable resin composition, and the curable resin composition is poured into a mold (for example, an optically transparent mold of which upper portion is made of a film) in which the (G) reinforcing fibers are placed. Subsequently, the curable resin composition is irradiated with light to react the radical polymerizable unsaturated groups to obtain a partially cured product, and the resultant partially cured product is taken out from the mold, and then the resultant partially cured product is further cured at a temperature ranging from 25 to 80° C. to obtain a molded product.

Although it cannot be specified generally, the time for allowing it to stand or for stirring after mixing the (A) resin material is not less than 5 minutes, preferably not less than 10 minutes. If the time for allowing it to stand or for stirring is less than 5 minutes, then the addition reaction of the (D) amine compound and/or mercaptan compound to the radical polymerizable unsaturated group of the (A) resin material (and the diluent having radical polymerizable unsaturated group) will not proceed sufficiently, and the curing rate of the curable resin composition will not increase.

Moreover, in the case of adding the (D) amine compound and/or mercaptan compound for curing epoxy groups, the time for allowing it to stand or for stirring is preferably less than 2 hours, although it cannot be specified generally. If the time for allowing it to stand or for stirring is more than 2 hours, then the curing of the epoxy will proceed to increase the viscosity.

Therefore, in the present invention, it is preferable to add the (C) radical polymerization initiator to the mixture to prepare a curable resin composition, until it passes 2 hours after allowing it to stand or for stirring for not less than 5 minutes, the mixture obtained by mixing the (A) resin material, the (B) diluent, and (D) amine compound and/or mercaptan compound, and pouring the resultant curable resin composition into a mold immediately. The temperature at which the (A) resin material, the (B) diluent and the (D) amine compound and/or mercaptan compound are mixed and allowed to stand or stirred is usually a normal temperature. The mixture may be heated while the mixture is allowed to stand or stirred, and the temperature at this time preferably ranges from 25° C. to 80° C.

When light irradiation is performed together, a ray having a wavelength of one or more of ultraviolet rays (280-380 nm), visible light (380-780 nm), or near infrared irradiation (780-1200 nm) is used. A source of light may be one which has a spectral distribution within the wavelength area, which is a sensitive area of the remaining photopolymerization initiator, for example, sunlight, a metal halide lamp, halogen lamp, an ultraviolet lamp, a fluorescent lamp, etc. are exemplary.

The time for irradiation of light for photo-curing is not less than 0.01 hours, preferably not less than 0.05 hours, although is cannot be generally specified because it varies in effective wavelength area, output, irradiation distance, thickness of the composition, etc.

EFFECT

In the curable resin composition of the present invention explained above, since the (A) resin material has radical polymerizable unsaturated groups, it has low viscosity, and it excels in the impregnation property to the (G) reinforcing fibers. Moreover, in the curable resin composition of the present invention, a portion of the (D) amine compound and/or mercaptan compound having one or more of active hydrogen in one molecule is additionally reacted to the radical polymerizable unsaturated group in the (A) resin material, and as a result, an adduct of a secondary or a tertiary amine, and/or mercaptan is partially generated in the framework of the resin. And since the adduct of a secondary or a tertiary amine, and/or mercaptan is present in the framework of the resin, curing reaction of epoxy groups is promoted, thereby accelerating the curing rate further. Moreover, since the curable resin composition contains aphoto polymerization-initiator, it is possible to react the radical polymerizable unsaturated group by light irradiation, that is photopolymerization is possible, and it is possible to accelerate the curing rate further.

EXAMPLE

An explanation will be given, about the present invention in detail, referring to Examples and Comparative Examples shown below. In each example, "parts" and "%" indicate value based on mass.

Synthesis Example 1

Into a reacting apparatus equipped with a stirrer, a reflux condenser, gas inlet pipes, and a thermometer, 189 g of EPI-COTE 828 (an epoxy resin product made by Japan Epoxy Resin Co., Ltd., epoxy chemical equivalent is 189, 1 chemical equivalent=189 g), 43 parts of methacrylic acid (0.5 equivalent), 0.8 parts of Cr naphthenate, and 0.07 parts of hydroquinone were charged, and then the resultant mixture was reacted at 120° C. for 2.5 hours, while blowing air thereinto, until the acid value reached 0 mg KOH to obtain a resin (HE-1) having radical polymerizable unsaturated groups and epoxy groups. The radical polymerizable unsaturated group/epoxy groups was 0.5/0.5 (equivalent).

Synthesis Example 2

To 100 parts of the resin (HE-1) synthesized in Synthesis Example 1, 25 parts of styrene monomer was added to obtain a resin (HE-2) which contains radical polymerizable unsaturated groups and epoxy groups, containing 20% of styrene monomer which is a radical polymerizable diluent.

Synthesis Example 3

To 100 parts of the resin (HE-1) synthesized in Synthesis Example 1, 25 parts of 3,4-epoxycyclohexenylmethyl-3',4'-epoxycyclohexenecarboxylate (Daicel Chemical Industries, Co., Ltd., brand name CELOXIDE 2021) was added, which is an alicyclic epoxy compound, to obtain a resin (HE-3) which contains radical polymerizable unsaturated groups and epoxy groups, containing 20% of CELOXIDE 2021, which is an epoxy diluent.

Synthesis Example 4

To 100 parts of EPICOTE828 (Japan Epoxy Resin Co., Ltd., epoxy chemical equivalent is 189), 100 parts of R-806 (vinyl ester resin product made by SHOWA POLYMER Co., Ltd.) was added and mixed to obtain a resin (HE-4) having radical polymerizable unsaturated groups and epoxy groups, which is a blend type vinyl ester. The radical polymerizable unsaturated group/epoxy groups was 0.25/0.75 (equivalent).

Example 1

Preparation of the Resin Composition

To 100 parts of the resin (HE-1), 1 part of diethylene triamine was added and the resultant mixture was allowed to stand at normal temperature for 10 minutes to proceed an addition reaction to the radical polymerizable unsaturated groups of the diethylene triamine, and thereafter 26 parts of EPICURE QX-40 (Japan Epoxy Resin Co., Ltd.), 0.5 parts of Co naphtenate, 1.2 parts of methyl ethyl ketone peroxide (Nippon Yushi Co., Ltd., PERMEC N), 1.0 part of 2,4,6-tris (dimethylaminophenyl)phenol (KAYAKU AKUZO Co., Ltd, DMP-30), which is a tertiary amine, were added to the resultant mixture to obtain a curable resin composition-1.

Hardening

The curable resin composition-1 was poured into a frame which was made with a glass plate so that thickness became 3 mm, and was allowed to stand at normal temperature, and as a result, it gelled in 20 minutes. Barcol hardness (soft) after 5 hours was measured to obtain a value of 46 and it was confirmed that it had cured sufficiently.

Example 2

Preparation of Resin Composition

To 100 parts of the resin (HE-2), 4.2 parts of triethylene tetramine was added and the resultant mixture was allowed to stand at normal temperature for 10 minutes to proceed the addition reaction to the radical polymerizable unsaturated groups of the triethylene tetramine, and thereafter 1.0 part of tertiary butyl perbenzoate (Nippon Oil & Fats Co., Ltd., PER-BUTYL O), which is a peroxide, to obtain the curable resin composition-2.

Hardening

The curable resin composition-2 was poured into a frame which was made with a glass plate so that thickness became 3 mm, and was allowed to stand at normal temperature, and as a result, it gelled in 10 minutes. Barcol hardness (soft) after it was allowed to stand for further 30 minutes was measured to obtain a value of 40 and it was confirmed that it had cured sufficiently.

To 100 parts of the resin (HE-3), 42 parts of mercaptan compound, i.e. EPICURE QX-40 (a product of Japan epoxy resin Co., Ltd.) was added and the resultant mixture was allowed to stand at normal temperature for 1 hour to proceed a part of addition reaction to the radical polymerizable unsaturated groups contained in the EPICURE QX-40, and thereafter 1 part of IRUGACURE 819 (made by Chiba specialty chemical Co., Ltd.), which is a photopolymerization initiator having sensitivity within the range of ultraviolet rays to visible light domain, and 3 parts of dimethylaminoethylmethacrylate, which is a tertiary amine having radical polymerizable unsaturated groups, were added to obtain a curable resin composition-3.

Curing of the Resin Composition

The curable resin composition-3 was poured into a frame which was made with a glass plate so that thickness became 3 mm, and was irradiated with light using a 400 W metal halide lamp for 10 minutes and as a result, it gelled. The irradiation was performed for 30 minutes and it was allowed to stand at normal temperature for 2 hours, and then Barcol hardness (soft) was measured on the resultant gelled product to obtain the value of 40 and it was confirmed that it had cured sufficiently.

Example 4

Preparation of Resin Composition

To 100 parts of the resin (HE-4), 15 parts of EPICURE113 (made by Japan Epoxy Resin Co., Ltd.) was added and the resultant mixture was allowed to stand for 5 minutes to proceed a part of addition reaction to the radical polymerizable unsaturated groups of the EPICURE113, and thereafter 3 parts of dimethylaminoethylmethacrylate, which is a tertiary amine having radical polymerizable unsaturated groups, 0.5 parts of cobalt naphtenate, and 1.2 parts of methylethylketoneperoxide (PERMEK N, made by Nippon Oil & Fats Co., Ltd.) were added to the resultant mixture to obtain a curable resin composition-4.

Curing of the Resin Composition

The curable resin composition-4 was poured into a frame which was made with a glass plate so that thickness became 3 mm, and was allowed to stand at normal temperature for 30 minutes, while proceeding an additional reaction to the radical polymerizable unsaturated groups of the EPICURE 113, and as a result, the resin composition gelled. Barcol hardness (soft) was measured on the resultant gelled product after being allowed to stand for 5 hours to obtain the value of 40 and it was confirmed that it had cured sufficiently.

Comparative Example 1

The same operation was performed as in Example 1 with the exception of using no diethylenetriamine, and as a result, it took 40 minutes until the resin composition gelled at normal temperature, and Barcol hardness (soft) after 5 hours was measured to obtain the value of 3, and it revealed that it had not cured sufficiently.

Comparative Example 2

The same operation was performed as in Example 2, with the exception of adding 4.2 parts of triethylenetetramine and thereafter immediately adding 1.0 parts of a peroxide catalyst tertiary butylperbenzoate (PERBUTYLO made by Nippon Oil & Fats Co., Ltd.) without allowing it to stand for 10 minutes, and as a result, the resin composition gelled in 10 minutes similarly in a drying apparatus, and Barcol hardness (soft) after 30 minutes was measured to obtain the value of 15, and it was confirmed that it had not cured sufficiently.

Comparative Example 3

The same operation was performed as in Example 3, with the exception of adding 42 parts of EPICURE QX-40 (made by Japan Epoxy Resin Co., Ltd.), which is a mercaptan compound, and thereafter immediately adding 1 parts of IRUGACURE 819 (made by Chiba specialty chemical Co., Ltd.), which is a photopolymerization initiator having sensitivity within the range of ultraviolet rays to visible light domain, and 3 parts of dimethylaminoethylmethacrylate, which is a tertiary amine having radical polymerizable unsaturated groups, without allowing it to stand for 1 hour. And then Barcol hardness (soft) after being irradiated with light for 30 minutes and then being allowed to stand for 2 hours was measured to obtain the value of 20, and it was confirmed that it had not cured sufficiently.

Comparative Example 4

The same operation was performed as in Example 4, with the exception of adding 15 parts of EPICURE 113 (made by Japan Epoxy Resin Co., Ltd.), which is an aliphatic amine, and thereafter immediately adding 3 parts of dimethylaminoethylmethacrylate, which is a tertiary amine having radical polymerizable unsaturated groups, 0.5 parts of cobalt naphtenate, and 1.2 parts of methylethylketoneperoxide (PERMEK N, made by Nippon Oil & Fats Co., Ltd.), without allowing it to stand for 5 minutes. And then the resin composition was allowed to stand at normal temperature for 30 minutes, and as a result the resin composition gelled. Barcol hardness (soft) after being allowed to stand for 5 hours was measured to obtain the value of 20, and it was confirmed that it had not cured sufficiently.

Example 5

9 plies of a carbon fiber cloth (TORAYCA C06644B made by TORAY Co., Ltd.) were set in a lower mold made of aluminum, and then an upper mold made of aluminum was set thereon, and a pouring port and an outlet port were disposed to the middle of the upper mold and the lower mold.

Subsequently, after the upper mold and the lower mold were set to be 60° C., the curable resin composition-1 used in Example 1 was poured thereinto, and 30 minutes later, the mold was cooled and the resultant resin composition was stripped from the mold to obtain a molded product. A bending test in accordance with JIS K 7017 was performed on the resultant molded product. And as a result, as shown in Table 1, it was confirmed that the molded product had been cured sufficiently.

Example 6

6 plies of a satin woven glass fiber cloth were set in a lower mold made of aluminum, and then a vinylon film as an upper mold was set thereon, and a pouring port and an outlet port were disposed to the middle of the upper mold and the lower mold.

Subsequently, the curable resin composition-3 used in Example 3 was poured thereinto at normal temperature, and then irradiation with light was performed using a 400 W metal halide lamp for 10 minutes through the vinylon film to obtain a partially cured product. The resultant cured product was stripped from the mold, and then further heated in a drying apparatus held at 60° C. for 20 minutes, and thereafter was cooled to obtain a molded product. A bending test in accordance with JIS K 7017 was performed on the resultant molded product. And as a result, as shown in Table 1, it was confirmed that the molded product had been cured sufficiently.

Comparative Example 5

The same operation as in Example 5 was performed using the resin composition used in Comparative Example 1, and as a result, the strength of the obtained molded product was inferior to that of Example 5.

Comparative Example 6

The same operation as in Example 6 was performed using the resin composition used in Comparative Example 3, and as a result, the strength of the obtained molded product was inferior to that of Example 6.

TABLE 1

|  | Example 5 | Example 6 | Comparative Example 5 | Comparative Example 6 |
|---|---|---|---|---|
| Bending strength (MPa) | 620 | 332 | 495 | 258 |
| Bending modulus of elasticity (GPa) | 45 | 17 | 38 | 14 |

INDUSTRIAL APPLICABILITY

A curable resin composition of the present invention is applicable to an FRP member such as a structural member in which high intensity using a carbon fiber or aramid fiber is needed for aerospace, rolling stock, pressure vessel, engineering works architecture.

The invention claimed is:

1. A curable resin composition comprising:
   (A) a resin material having a radical polymerizable unsaturated group and an epoxy group, (C) a radical polymerization initiator,
   (D) an amine compound having one or more active hydrogen in one molecule and a mercaptan compound containing one or more of active hydrogen in one molecule, and
   (E) a compound which is an adduct in which the amine compound and a mercaptan compound is reacted with the radical polymerizable unsaturated group of the (A) resin material.

2. The curable resin composition as set forth in claim 1, further comprising (F) a tertiary amine.

3. The curable resin composition as set forth in claim 2, wherein said (F) tertiary amine is a tertiary amine which contains a radical polymerizable unsaturated group in a molecule.

4. The curable resin composition as set forth in claim 1, further comprising (G) a reinforcing fiber.

5. The curable resin composition as set forth in claim 1, wherein said (A) resin material having a radical polymerizable unsaturated group and epoxy group is a resin obtained by vinyl ester group modified epoxy resin so that an equivalence ratio between the epoxy group and the radical polymerizable unsaturated group ranges from 0.95/0.05 to 0.05/0.95.

6. The curable resin composition as set forth in claim 1, wherein said (A) resin material having a radical polymerizable unsaturated group and epoxy group is a mixture of an epoxy resin and a radical polymerizable resin so that an equivalence ratio between the epoxy group and the radical polymerizable unsaturated group ranges from 0.95/0.05 to 0.05/0.95.

7. The curable resin composition as set forth in claim 1, wherein said (C) radical polymerization initiator is a normal temperature radical polymerization initiator consisting of an organic peroxide and a cobalt salt.

8. The curable resin composition as set forth in claim 1, wherein said (C) radical polymerization initiator is a thermal polymerization initiator and/or a photo polymerization-initiator.

9. A molded product obtained by curing said curable resin composition as set forth in claim 1.

* * * * *